Sept. 6, 1966 P. BAUER 3,270,758

FLUID AMPLIFIERS

Filed April 22, 1963

INVENTOR
PETER BAUER

BY Edward M. Farrell

ATTORNEY

United States Patent Office 3,270,758
Patented Sept. 6, 1966

3,270,758
FLUID AMPLIFIERS

Peter Bauer, Bethesda, Md., assignor to Sperry Rand Corporation, New York, N.Y., a corporation of Delaware
Filed Apr. 22, 1963, Ser. No. 274,741
2 Claims. (Cl. 137—81.5)

Figures 1A, 1B, 2A, 2B, 3A, 3B:
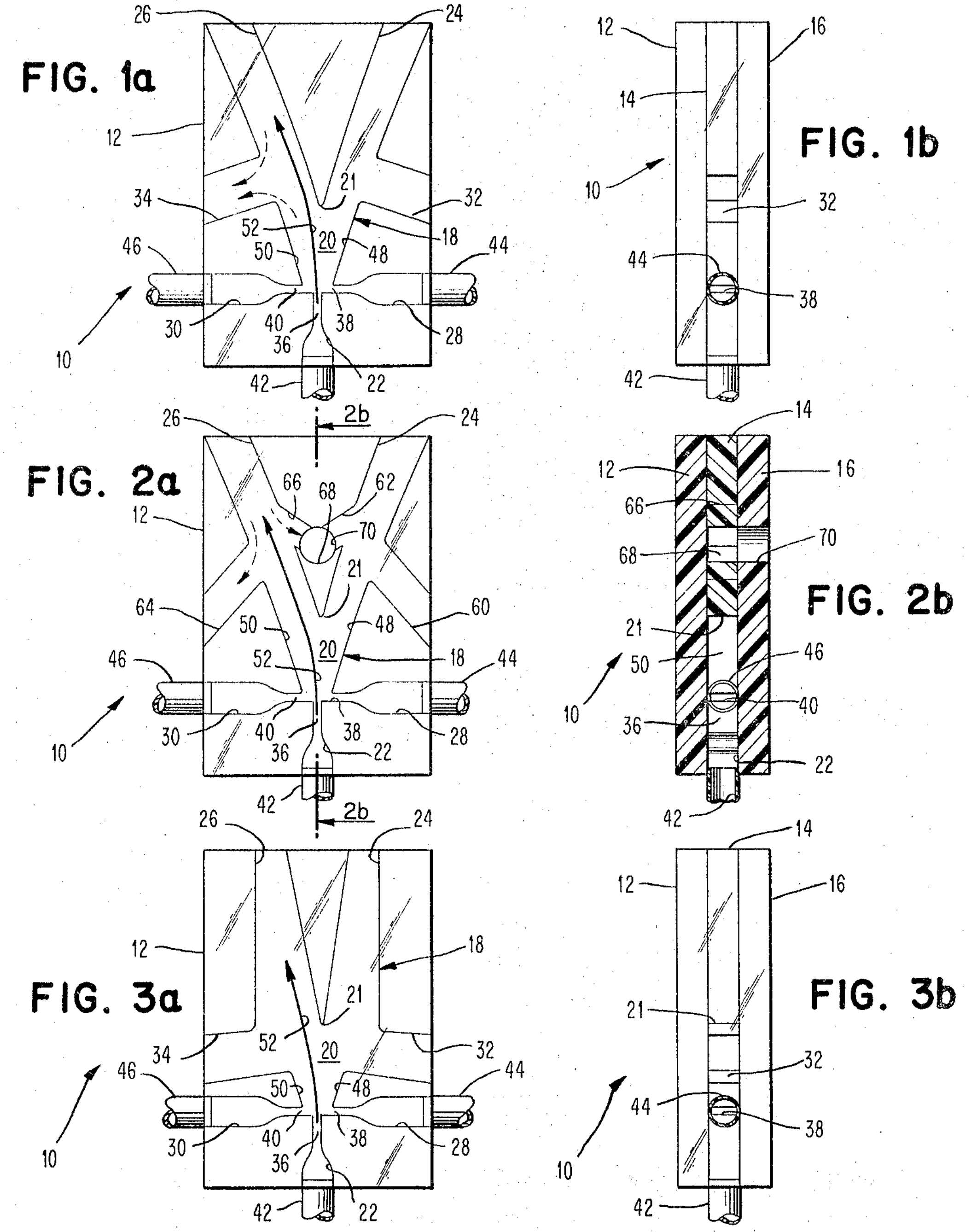

The invention relates to pure fluid amplifiers and more particularly to pure fluid amplifiers comprising means to eliminate the influence of back loading on the operation of the amplifier.

Fluid amplifiers having no moving parts except the operation fluid, or pure fluid amplifiers, are known in the art. They comprise generally a system of interconnected fluid channels arranged such that a fluid power stream may be switched from one output channel to another by means of one or more fluid control streams each of which has less momentum than the power stream.

Pure fluid amplifiers are of two general types, namely, momentum exchange amplifiers and boundary layer control amplifiers. In a momentum exchange amplifier a control stream is directed against the side of the power stream and deflects the power stream away from the control stream. The power stream flows at an angle with respect to its original direction, the tangent of this angle being a function of the momentum of the control stream and the original momentum of the power stream. Thus it is possible to selectively deflect the power stream to one or more target areas or outlet channels where it may perform a work function.

In boundary layer control amplifiers the power stream is directed to a target area or outlet channel by the pressure distribution in the boundary layer region of the power stream. This pressure distribution is controlled by the wall configuration of the interaction chamber, the energy level of the power stream, the fluid transport characteristics, the back loading of the output channels and the flow of control fluid into the boundary layer region. The selective deflection of the power stream into one outlet channel or the other is controlled by introducing control fluid into the boundary layer of the power stream. As a result of the change in pressure distribution in the power stream and its boundary layer, the power stream is caused to switch to the other outlet channel. The configuration of the interaction chamber may be designed such that the power stream becomes locked to a side wall and remains locked thereto even though the flow of control fluid has been terminated. Since accordingly, information may be introduced into the device at a certain moment and extracted at a later moment, the device has memory properties and may be used, for example, as a memory or storage unit in fluid data processors.

Fluid amplifiers of both the momentum exchange and the boundary layer control types are very sensitive to back loading or back pressure. With back loading or back pressure here is meant the pressure influence on the operation of the amplifier of load devices connected to its output channels. Such back loading causes pressure differences across the power stream followed by disturbances in the flow pattern of the power stream.

Sensitivity of an amplifier to back loading is usually an undesirable feature. For example, an amplifier sensitive in this respect may switch its output from its back loaded channel to its other channel as soon as the back pressure exceeds a certain level. It will be understood that such an amplifier becomes unstable and certainly cannot be relied on as a storage device. Also, such an amplifier may require a higher level of control energy to ensure reliable switching under load. Further, the pressure disturbances in the power stream may increase the noise level of the device.

A fluid amplifier is designed to perform a certain work function. Usually it is meant to drive a certain load. This load may be a specific device with its specific characteristics; or, more often than not, it will be a variety of different devices each having its specific characteristics. It will be appreciated that it should not be necessary to design a different fluid amplifier for every load condition, i.e. for every different load device, number of load devices and their possible interconnection that may occur in operation.

Insensitivity to back loading means that the operation and performance of the fluid device, particularly in the interaction region, is as little as possible influenced by loading conditions.

A further very important consideration with respect to back loading, is the one concerning the particular output parameters. A fluid amplifier, in a particular state, will provide particular pressure-flow characteristics at the output. A unit or units to be fed from this output usually require different characteristics. One or the other of the parameters may have to be largely neglected in such interconnections. However, such an unmatched interconnection generally influences the operation of the driving unit, sometimes, even to the extent of making it inoperative.

In the prior art, elements had often to be designed to suit one particular type of load or a range of loads, resulting in elements with reduced performances characteristics. Such design and subsequent manufacture, however, is uneconomical.

Accordingly, it is an object of the invention to provide a pure fluid amplifier being insensitive to backloading.

It is a further object of the invention to provide a fluid amplifier which retains its storage capability under variable load conditions.

According to the invention in a pure fluid amplifier, the influence of the back loading on the operation of the amplifier is neutralized by providing an exhaust port in an outlet channel of the amplifier through which the excess fluid, resulting from said back loading, may be released and the pressure equalized.

Other objects, uses and advantatges and the specific nature of the invention will clearly appear from the following description and from the accompanying drawings, in which:

FIG. 1*a* illustrates a plan view of one form of a fluid amplifier constructed in accordance with the invention, FIG. 1*b* illustrates a side view of the device of FIG. 1*a*, FIG. 2*a* illustrates a plan view of another embodiment of a fluid amplifier constructed in accordance with the invention, FIG. 2*b* illustrates a sectional side view of the device of FIG. 2*a*, taken along the line **2*b*** in FIG. 2*a*, FIG. 3*a* illustrates a plan view of still another embodiment of a fluid amplifier constructed in accordance with the invention, and FIG. 3*b* illustrates a side view of the device of FIG. 3*a*.

FIG. 1 illustrates one embodiment of a pure fluid amplifier constructed in accordance with this invention and is referred to by reference numeral 10. Amplifier 10 comprises three laminae 12, 14 and 16. Lamina 14 is positioned between plates 12 and 16 and is tightly sealed therebetween by suitable means, such as screws or cement (not shown). The laminae 12, 14 and 16 may be of any metallic, plastic or other suitable material. For the purpose of illustration laminae 12, 14 and 16 are shown as being made of a transparent plastic material.

The lamina 14 has a cut-out section, or chamber obtained, for example, by means of a cutting or stamping operation. The entire cut-out section is designated as a configuration 18. The cut-out section or configuration 18 comprises an interaction or amplification region 20, a supply fluid inlet 22, two fluid outlets 24 and 26, two control stream inlets 28 and 30 and two exhaust ports 32 and 34. The supply fluid inlet 22 forms a constricted supply orifice 36, communicating with the interaction region 20. The term orifice as used herein includes an orifice having parallel, converging or diverging walls or any conventional shape. The control fluid inlets 28 and 30 communicate with the interaction region 20 through constricted control orifices 38 and 40.

The supply fluid inlet 22 and the control fluid inlets 28 and 30 are provided with tubes 42, 44 and 46, respectively. Tube 42 is connected with a source of fluid under pressure. The fluid under pressure may be gas or air, or water or other liquid. Fluid flow regulating devices may be used in conjunction with the fluid source so as to provide a constant flow of fluid at a desired pressure. Such fluid regulating devices are of conventional construction.

Sources of fluid under pressure provide the control stream at the inlets 44 and 46. The generation of control signals and their operation in the amplifier is not related to the present invention and will not be discussed here.

Walls 48 and 50 of interaction region 20 are set back from orifice 36 so that fluid issuing from orifice 36 will lock onto either of these walls in accordance with the boundary layer control principle discussed above.

Supply fluid entering the device 10 through supply inlet 22 is, for the purpose of explanation, assumed to be at a certain pressure above atmospheric pressure. As the stream of fluid is reduced in cross-sectional area in the orifice 36, its velocity increases. The fluid stream of reduced cross-sectional area, indicated by arrow 52 is called the power stream of the device.

Assume for the purpose of explanation that the power stream is locked on wall 50, so that the power stream leaves the device through outlet channel 26. If back pressure arises at outlet channel 26, of a level exceeding the design level of the device, a portion of the power stream fluid entering outlet 26 will return through outlet 26 and egress through exhaust port 34 to atmosphere, or it may be returned to the low pressure side of the system in which the device is incorporated. The quantity of power fluid leaving through the exhaust port depends on the level of the excess pressure. As soon as the pressure of the power stream has decreased to the operating level, the release of fluid ends. In case the back loading at outlet channel 26 is heavy, the release of excess pressure will already take place while the power stream passes the entrance opening of exhaust port 34.

The described process of release of back pressure at outlet channel 26, is exactly the same when the power stream is locked onto wall 48 and exits through channel 24. In this case eventual excess pressure is released through exhaust port 32.

In FIGS. 1*a* and 1*b* the exhaust ports 32 and 34 are being shown as located along the outer walls of the outlet channels 24 and 26 respectively. It will be understood that the exhaust ports may be located along the inner wall of the respective outlet channel, with no basic difference in operation. Such exhaust ports may be united to communicate through one channel with the low pressure side of the system or the atmosphere.

It will be appreciated that the release of back pressure according to the invention has important advantages. Without resorting to special dimensions, geometries and precise machining, as demanded for prior art devices, a device which is very stable under varying load conditions is created. In addition, its switching is very reliable and its noise level negligible. The presence of the exhaust ports does not interfere with the operation of the device at the design pressure level, since the power stream has sufficient kinetic energy to retain its physical boundaries while passing the exhaust ports.

FIGS. 2*a* and 2*b* illustrate a modification of the device illustrated by FIGS. 1*a* and 1*b*. Like parts are indicated with the same reference numerals.

In the embodiment illustrated by FIGS. 2*a* and 2*b*, each outlet channel comprises exhaust ports. Outlet channel 24 includes exhaust ports 60 and 62; outlet channel 26 includes exhaust ports 64 and 66.

Exhaust ports 62 and 66 communicate with a bore 68 in the lamina 14. Bore 68 in turn communicates with a bore 70 in lamina 16. Bore 70 and the exhaust ports 60 and 64 may be connected with the low pressure side of the system, for example, by tubing means.

Assuming that the power stream 52 is locked on wall 50, it will be understood that excess back pressure occurring at outlet channel 26 causes a corresponding portion of the power stream to leave through the exhaust ports 64 and 66. It will be appreciated that the provision of two exhaust ports on each side of an outlet channel renders the operation of the device more stable and reliable than when only one such port is employed.

In the embodiments illustrated by FIGS. 1*a*, 1*b*, 2*a* and 2*b*, the exhaust ports are located fairly remote from the interaction region 20 of the device, and actually downstream from the divider point 21.

The term downstream is used here with respect to the direction of flow of the power fluid issuing from orifice 36, and indicated by the arrow 52.

FIGS. 3*a* and 3*b* illustrate an embodiment of the present invention in which the exhaust ports are located upstream from the divider point of the device. It will be observed that the outlet channels 24 and 26 are provided with an exhaust port 32 and 34 respectively and that these ports are located substantially upstream from the divider point 21. The function and operation of these exhaust ports are the same as explained for the embodiments of FIGS. 1*a*, 1*b* and 2*a*, 2*b*. The advantage of the location of the exhaust ports 32 and 34 as illustrated by FIGS. 3*a* and 3*b*, is that this location is in a high velocity region of the device, which, as has been established, is advantageous from the point of view of efficiency and pressure recovery of the device.

It will be understood that modifications and variations may be effected without departing from the scope of the present invention. For example, it will be understood that although the devices illustrated and described are basically of planar construction, a device according to the invention may have a third dimension of substantial magnitude. Also the number of exhaust ports per outlet channel may be greater than two. Further the direction of the exhaust ports with respect to the direction of the outlet channels may be varied as well as their dimensions.

The embodiments of the invention in which an exclusive property or privilege is claimed are defined as follows:

1. A fluid amplifier comprising a supply orifice, two control fluid inlets and at least two output channels, a dividing element between said channels, said dividing element having an apex facing the supply orifice, conduit means disposed in said dividing element connection with each of said two output channels downstream of said apex, said conduit means connecting said output channels with each other and in common to the ambient atmosphere for eliminating excess fluid in either one of said output channels due to pressure build-up.

2. A fluid device comprising a supply orifice, two control fluid inlets and at least two output channels, a dividing element between said channels, said dividing element having an apex facing the supply orifice, first conduit means disposed in said dividing element connected with each of said output channels downstream of said apex and providing fluid communication between said output channels, said conduit further connecting the output channels to each other, second conduit means connecting said first conduit means to the ambient atmosphere, an exhaust port connected to each of said output channels, each of said exhaust ports disposed in its respective output channel at a point substantially opposite to said conduit means.

References Cited by the Examiner

UNITED STATES PATENTS

| | | | |
|---|---|---|---|
| 3,024,805 | 3/1962 | Horton | 137—81.5 |
| 3,122,165 | 2/1964 | Horton | 137—81.5 |
| 3,168,897 | 2/1965 | Adams et al. | 137—81.5 |

FOREIGN PATENTS

| | | |
|---|---|---|
| 1,278,781 | 11/1961 | France. |

M. CARY NELSON, *Primary Examiner.*

LAVERNE D. GEIGER, *Examiner.*

S. SCOTT, *Assistant Examiner.*